US011795629B2

(12) United States Patent
Wong et al.

(10) Patent No.: US 11,795,629 B2
(45) Date of Patent: Oct. 24, 2023

(54) ARTICULATING CHANNEL

(71) Applicant: National Diversified Sales, Inc., Woodland Hills, CA (US)

(72) Inventors: Wai Keong Bryce Wong, Tulare, CA (US); Michael Schreiber, York, PA (US); David Rusch, Springville, CA (US); Daniel Nourian, Reedley, CA (US); Ryan Larsen, Visalia, CA (US); Clem Neale Vann, III, Fredericksburg, TX (US)

(73) Assignee: National Diversified Sales, Inc., Woodland Hills, CA (US)

( * ) Notice: Subject to any disclaimer, the term of this patent is extended or adjusted under 35 U.S.C. 154(b) by 0 days.

(21) Appl. No.: 17/575,407

(22) Filed: Jan. 13, 2022

(65) Prior Publication Data

US 2023/0220633 A1   Jul. 13, 2023

(51) Int. Cl.
*E01C 11/22* (2006.01)
*E03F 3/04* (2006.01)
*E03F 5/14* (2006.01)
*C02F 1/00* (2023.01)
*C02F 103/00* (2006.01)

(52) U.S. Cl.
CPC .......... *E01C 11/227* (2013.01); *E03F 3/046* (2013.01); *E03F 5/14* (2013.01); *C02F 1/001* (2013.01); *C02F 2103/001* (2013.01); *C02F 2201/004* (2013.01)

(58) Field of Classification Search
CPC ........... E01C 11/227; E03F 3/046; E03F 5/14; C02F 1/001; C02F 2103/001; C02F 2201/004

USPC ........................................................ 210/640
See application file for complete search history.

(56) References Cited

U.S. PATENT DOCUMENTS

| 137,562 A | 4/1873 | Nichols |
|---|---|---|
| 558,778 A | 4/1896 | Coopek |
| 2,135,103 A | 11/1938 | Dimick |
| 2,648,200 A | 8/1953 | Dimick |

(Continued)

FOREIGN PATENT DOCUMENTS

| DE | 20302991 U1 * | 7/2004 | .............. E01C 11/22 |
|---|---|---|---|
| GB | 2414031 A * | 11/2004 | .............. E01C 11/12 |

OTHER PUBLICATIONS

Marley_DE20302991U1_translated.pdf (Year: 2004).*

*Primary Examiner* — Ekandra S. Miller-Cruz
(74) *Attorney, Agent, or Firm* — Fulwider Patton LLP

(57) ABSTRACT

A channel for fluid flow comprising a first unit and a second unit connected to each other. The first unit comprises a first u-section having a first open top side, and a first grate extending across the first open top side and removably attached to the first u-section. The second unit comprises a second u-section having a second open top side, and a second grate extending across the second open top side and removably attached to the second u-section. The first grate defines a negative semicircular distal end having a first diameter and a first center point. The second grate defines a positive semicircular proximal end having a second diameter and a second center point. The first center point is coincident with the second center point and the first diameter and the second diameter are sized such that the positive semicircular proximal end fits within the negative semicircular distal end.

8 Claims, 8 Drawing Sheets

(56) References Cited

U.S. PATENT DOCUMENTS

| | | | |
|---|---|---|---|
| 3,127,821 A | * | 4/1964 | Lebaron, Jr. .............. E03F 5/06 |
| | | | 210/163 |
| 3,563,039 A | | 2/1971 | Olsen |
| 4,033,613 A | | 7/1977 | Bram |
| 4,436,326 A | | 3/1984 | Peaster |
| 4,952,094 A | * | 8/1990 | Spiess ....................... E03F 5/06 |
| | | | 405/36 |
| 4,954,015 A | | 9/1990 | Mcgowan |
| 5,215,338 A | | 6/1993 | Kimura et al. |
| 5,248,004 A | | 9/1993 | Witte |
| 5,879,106 A | | 3/1999 | Beamer |
| 6,802,962 B1 | * | 10/2004 | Browne, III ............ B63B 13/00 |
| | | | 210/474 |
| 6,860,678 B2 | | 3/2005 | Gunter |
| 7,025,532 B2 | | 4/2006 | Suazo et al. |
| 7,156,580 B2 | | 1/2007 | Suazo et al. |
| 7,165,914 B2 | | 1/2007 | Suazo |
| 7,357,600 B2 | | 4/2008 | Suazo et al. |
| 7,413,382 B2 | | 8/2008 | Hedstrom et al. |
| 7,955,027 B2 | | 6/2011 | Nourian et al. |

\* cited by examiner

ARTICULATING CHANNEL

BACKGROUND

The present invention is directed to a connection between a series of linear covered channels for conveying water away from a location where ponding might otherwise occur. Specifically, the invention is directed to a connection that allows a curvature to be introduced into the alignment of the channels, so that the channels may be positioned to provide an even and regular curvature around a design feature such as an athletics track, a fountain, or other outdoor feature where water might collect.

Open water channels are known in the art for providing the removal of water that has collected on the ground and that would otherwise collect in ponds. Typically, such a channel has an open U-shape in section, allowing water to flow into the top open portion of the channel, and to be conveyed along a conduit formed by a plurality of similar channels connected together, where it may be discharged into a larger water collection system. Commonly, the open part of the channel may be provided with a grate spanning between the upper tips of the U-shape, so that while water may flow into the channel, there is no danger of people stepping into the channel and injuring themselves. A plurality of similar linear channels are typically connected end-to-end to provide for a linear conduit.

Conventionally, a known method of connecting one such channel to the next is provided by a flange on one channel and a mating slot on the other. The flange is inserted into the slot to form a tight connection between the two channels. This system creates a rigid inflexible coupling that allows for the creation of an extended linear conduit made from a plurality of channels. Due to the rigidity of the coupling between each channel to the next, the resulting conduit is typically substantially straight, which is a desirable feature when the conduit is designed to extend along a feature that is straight, such as along the edge of a football field. A variation on this method is to produce a slot on one channel that is simply wider, and loose fitting. This allows a certain amount of rotation to occur between two channels, thereby permitting a curvature to be introduced into the channel.

However, this method leaves the undesirable result that the channel is left with unsightly and uneven connections in which the grating may have discontinuities with consequences for safety and also for admitting particulate matter that may end up blocking the channel. Further, the side walls of the channel may tend to open up and admit concrete to enter into the channel during the laying of the channel in a concrete base.

Thus there is a need in the art for a system and method of connecting open channels to each other that addresses these problems. The present invention addresses these and other needs.

SUMMARY OF THE INVENTION

In a preferred embodiment, the invention is a channel system for fluid flow comprising a first unit and a second unit configured for connection to each other.

The first unit comprises a first u-section having a first open top side, and a first grate extending across the first open top side and removably attached to the first u-section.

The second unit comprises a second u-section having a second open top side, and a second grate extending across the second open top side and removably attached to the second u-section.

The first grate defines a negative semicircular distal end having a first diameter and a first center point. The second grate defines a positive semicircular proximal end having a second diameter and a second center point.

Further when the first unit is connected to the second unit, the first center point is coincident with the second center point and the first diameter and the second diameter are sized such that the positive semicircular proximal end fits within the negative semicircular distal end.

In some embodiments, the first u-section defines a first detent at a distal end and the second u-section defines a second detent at a proximal end, the first detent being configured to engage with the second detent so as to permit rotation of the first unit in relation to the second unit about a vertical axis extending through the first center point and through the second center point when the first unit is connected to the second unit.

In further embodiments, the first grate defines a downward extending beam adjacent the negative semicircular distal end, and the second grate includes a proximally extending clip which defines an upwardly facing channel that is sized to receive the downwardly extending beam when the first unit is connected to the second unit.

In yet further embodiments, the second u-section defines a left platform on a left vertical wall and further defines a right platform extending along a right vertical wall, and the second grate is sized to rest upon, and to span between, the left platform and the right platform.

In further embodiments, the left platform and the right platform define a left channel and a right channel respectively, and the second grate defines a left beam adjacent a left edge and a right beam adjacent a right edge, and wherein the left channel receives the right beam and the left channel receives the left beam.

In yet further embodiments, the second u-section and the second grate are removably attached to each other through male and female detent means for preventing vertical movement and longitudinal movement of the second grate in relation to the second u-section.

In further embodiments, the second u-section has a centerline which is parallel to a left sidewall and to a right sidewall, the left sidewall having a left proximal end and a left distal end, the right sidewall having a right proximal end and a right distal end, wherein the left proximal end is shaped in the form of a left sector of a circle subtending to a left center point when viewed from above, and the right proximal end is shaped in the form of a right sector of a circle subtending to a right center point when viewed from above, wherein the left center point is coincident with the right center point at a common center point.

In some embodiments, the left sector and the right sector each subtend an angle of between 5 degrees and 30 degrees to the common center point.

In other embodiments, the common center point coincides with an axis of rotation between the first u-channel and the second u-channel.

In other aspects, the invention is a channel system for fluid flow, comprising a first unit and a second unit configured for connection to each other.

The first unit comprises a first u-section having a first open top side. The second unit comprises a second u-section having a second open top side.

The first u-section defines a first detent at a distal end and the second u-section defines a second detent at a proximal end, the first detent being configured to engage with the second detent so as to permit rotation of the first unit in relation to the second unit about a vertical axis located on a common horizontal centerline that is shared by the first unit and the second unit when the first unit is connected to the second unit.

Further, the second u-section has a centerline which is parallel to a left sidewall and to a right sidewall, the left sidewall having a left proximal end and a left distal end, the right sidewall having a right proximal end and a right distal end, wherein and the left proximal end is shaped in the form of a left sector of a circle subtending to a left center point when viewed from above, and the right proximal end is shaped in the form of a right sector of a circle subtending to a right center point when viewed from above, wherein the left center point is coincident with the right center point at a common center point.

In some embodiments, the left sector and the right sector each subtend an angle of between 5 degrees and 30 degrees to the common center point.

In further embodiments, the common center point coincides with an axis of rotation between the first u-channel and the second u-channel.

Other objects, features and advantages of the present invention will be apparent when the disclosure is considered in conjunction with the drawings set forth herein, which should be construed in an illustrative and not limiting sense.

BRIEF DESCRIPTION OF THE DRAWINGS

The present invention is described in detail below with reference to the attached drawing figures, wherein.

DETAILED DESCRIPTION OF THE PREFERRED EMBODIMENTS

In the following detailed description, certain preferred embodiments are described in order to provide a thorough understanding of the present invention. The structures described in this specification are all formed by known molding process from known polymers.

Figure 1:
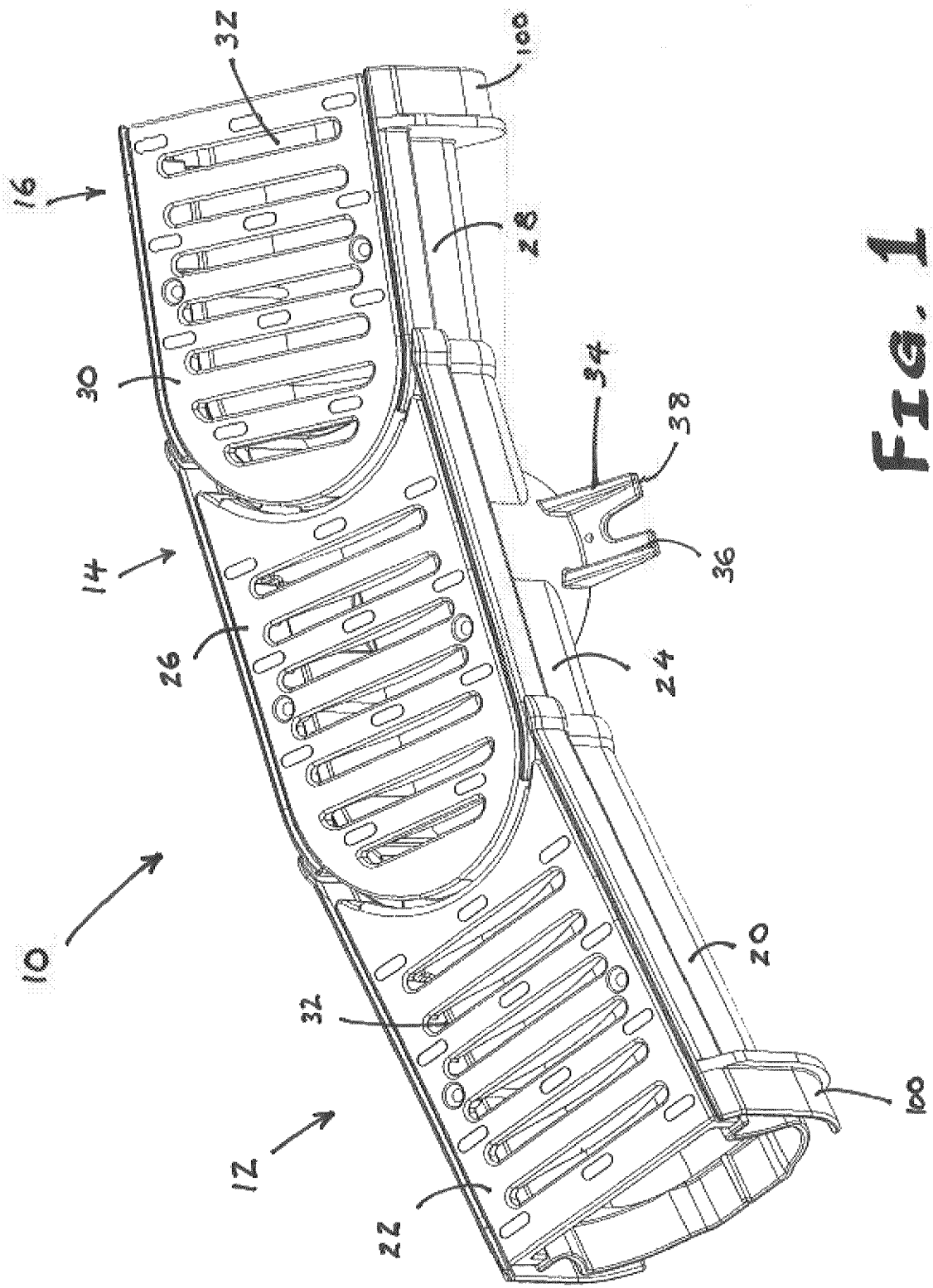
FIG. 1 is a perspective view of a channel with connected units having features of the invention, shown in a bent condition.
Figure 2:
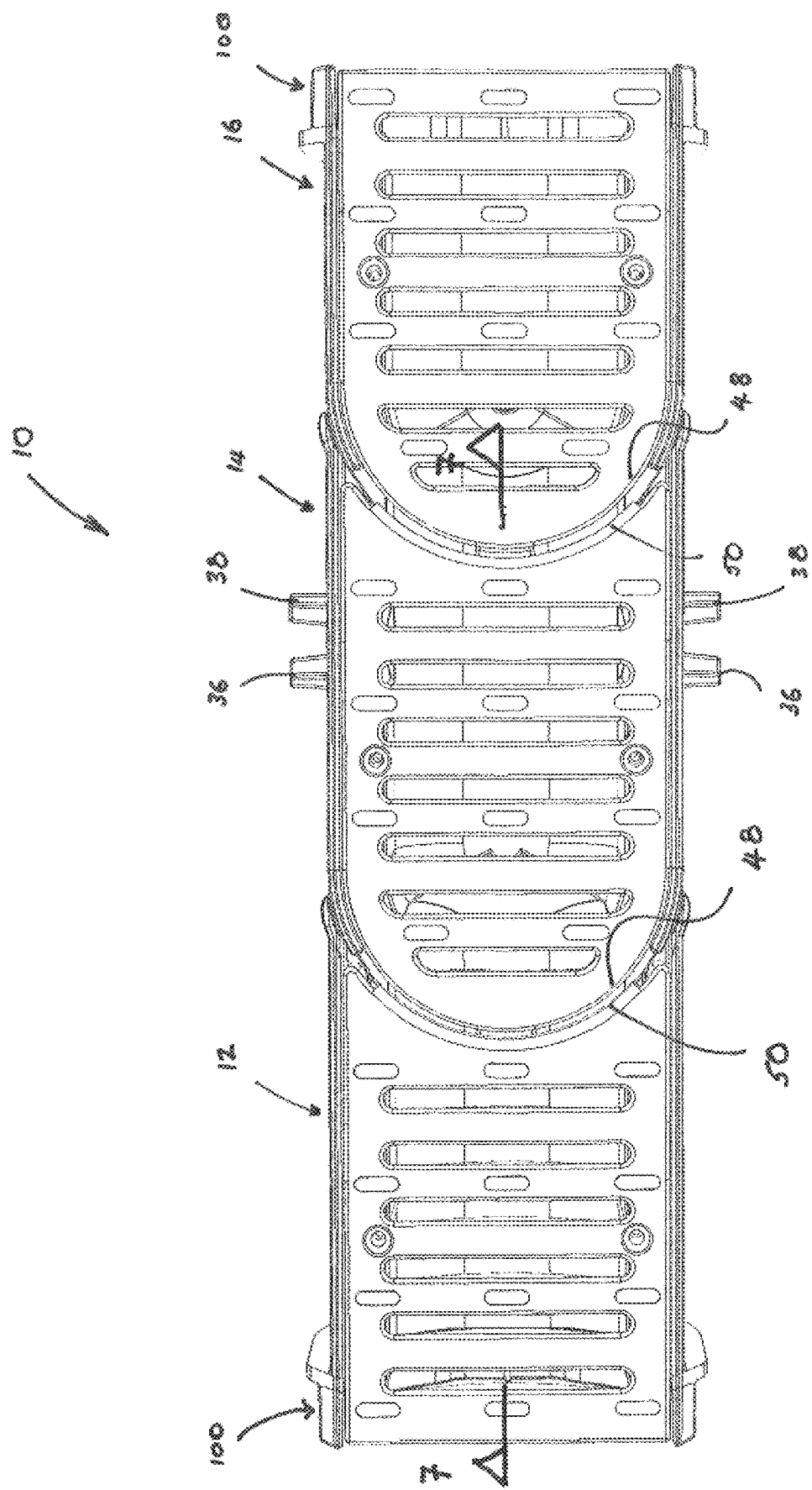
FIG. 2 is a top plan view of the channel in FIG. 1, but shown in a linear condition.

FIG. 1 shows a perspective view from above of a channel 10 that includes features of the invention in a bent configuration. FIG. 2 shows the same channel, but in a linear configuration. The embodiment in FIGS. 1 and 2 shows a channel that comprises three units, 12, 14, 16 that are specifically configured so that the units can be aligned with each other such that an elongate axis of one unit can be rotationally offset from the elongate axis of a succeeding unit in a horizontal plane, but not in a vertical plane. However, three units is not an essential feature and the invention may comprise a channel with two units having the inventive features, or it may include any number greater than two units, depending on the required configuration of the overall channel.

In the embodiment of FIG. 1, each unit comprises a u-section and a grate. As used herein, the term "u-section" defines a section that is a generally "U" shaped open channel. Thus, unit 12 comprises u-section 20 and grate 22; unit 14 comprises u-section 24 and grate 26; unit 16 comprises u-section 28 and grate 30. Each grate is a flat plate that defines a series of parallel slits 32, that are sized to permit aqueous run-off and small particles to enter into the u-section, but to filter out larger debris. In the embodiment of FIG. 1, the central unit 24 reveals features for attaching the channel 10 to the earth during a assembly. A lateral fork element 34 is attached to the bottom side of the unit 24. It comprises two tines 36, 38 set apart, and protrudes laterally beyond and outside of the top profile of the unit to allow an assembler to knock a spike (not shown) into the earth to hold the channel steady during assembly.

Figure 3:
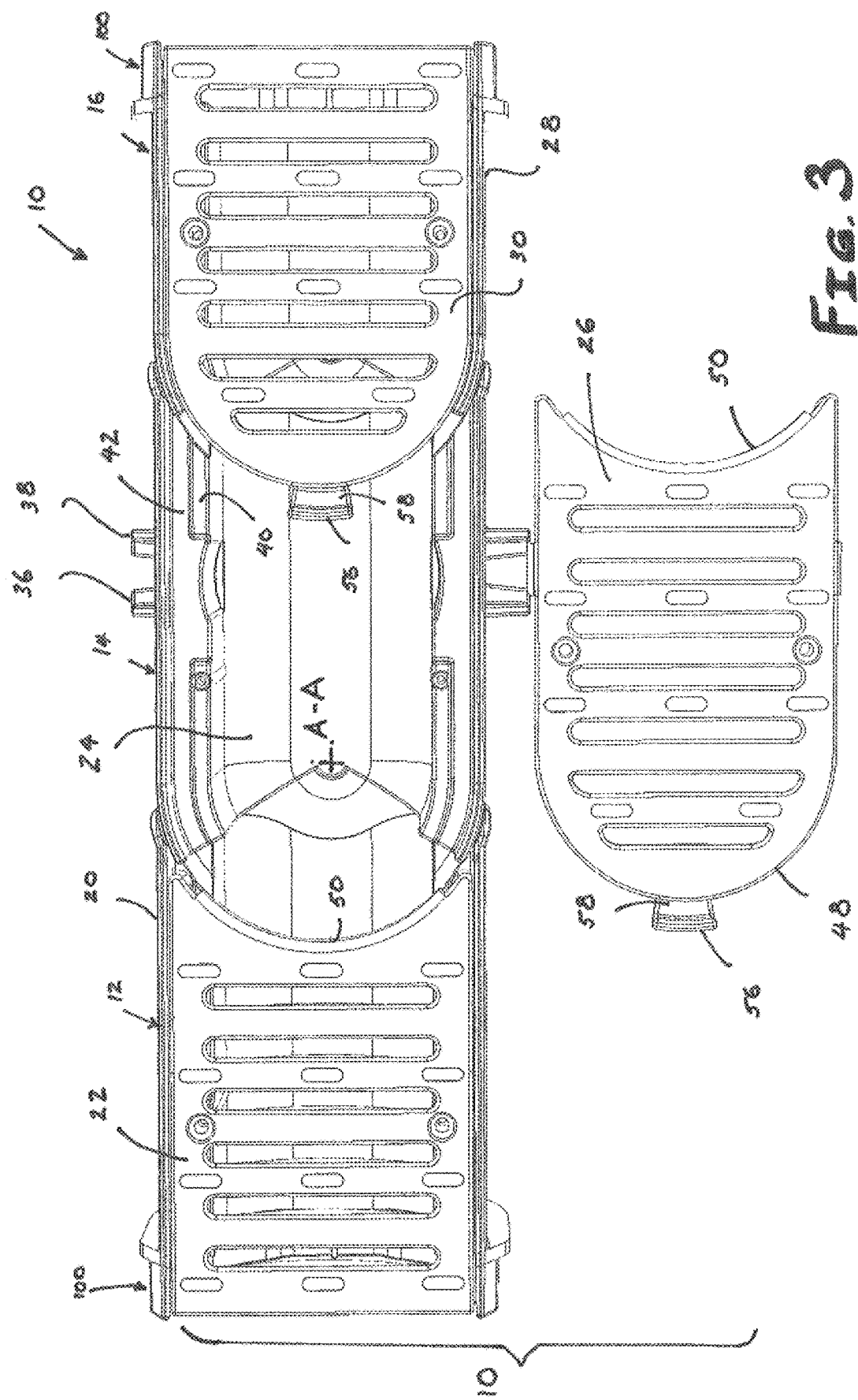
FIG. 3 is the top plan view of FIG. 2, but with the channel shown in partially exploded view.
Figure 4:
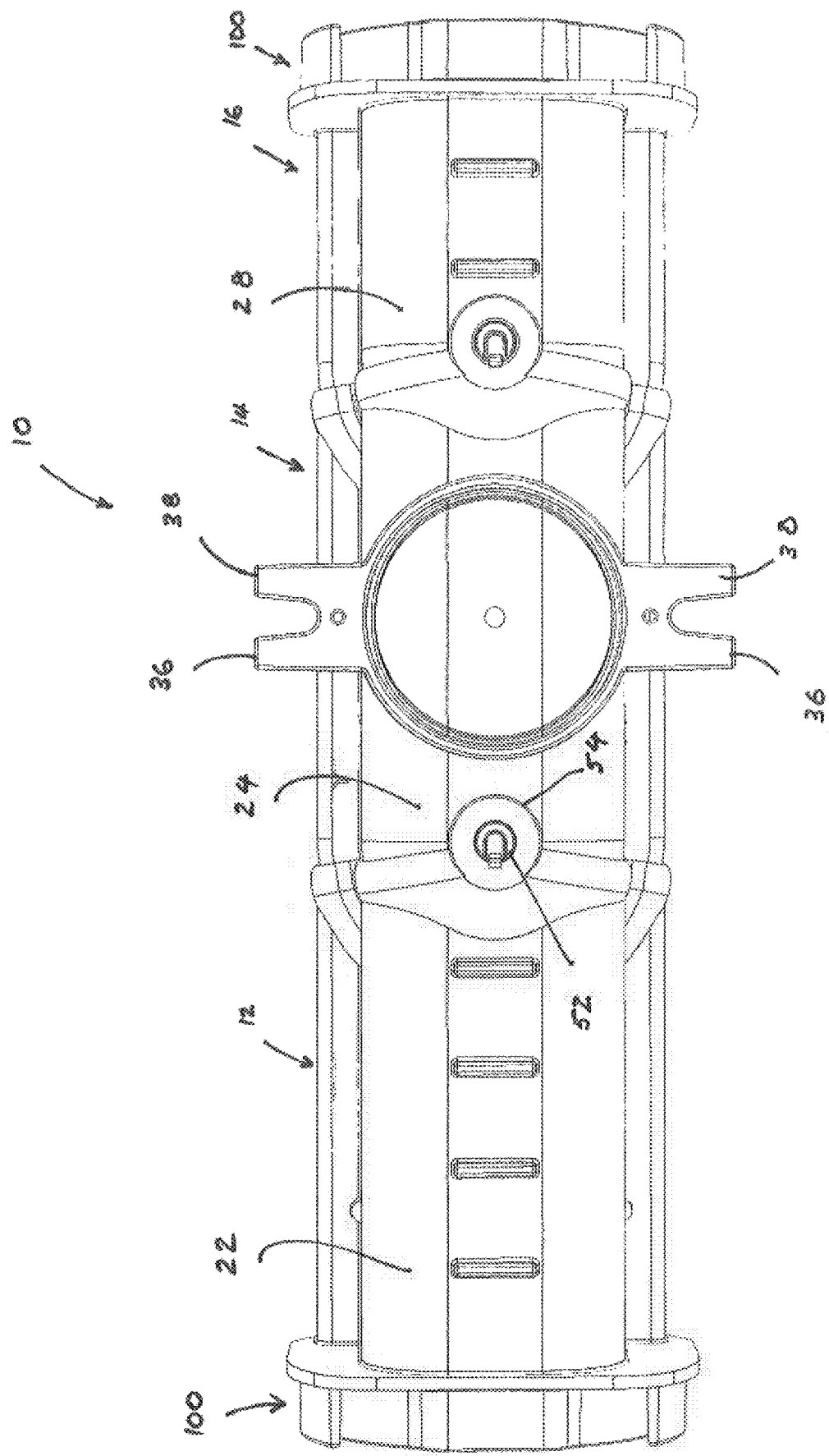
FIG. 4 is a bottom view of the channel shown in FIG. 2
Figure 5:
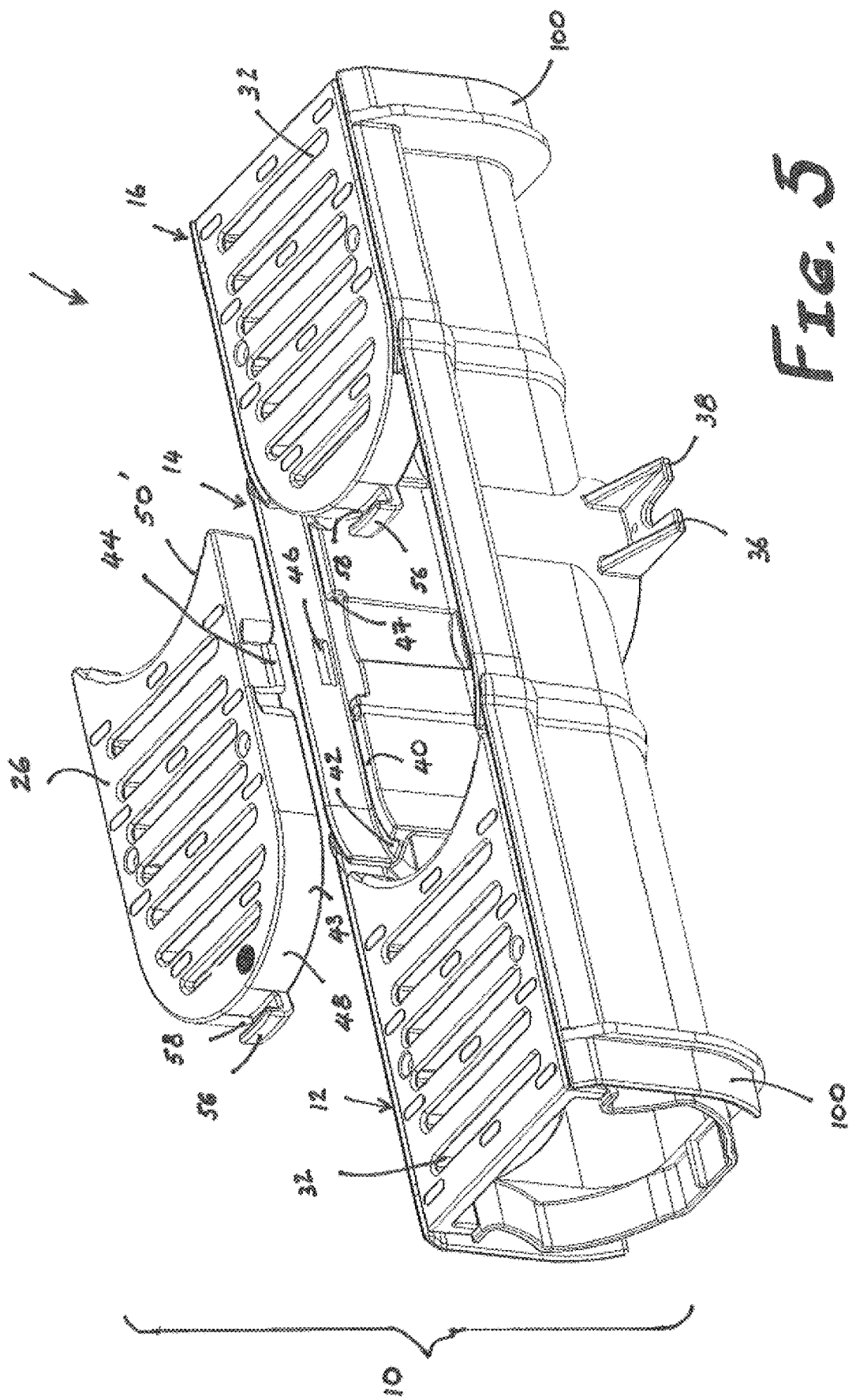
FIG. 5 is a perspective view, from above, of the channel shown in FIG. 2, in partially exploded view.
Figure 6:
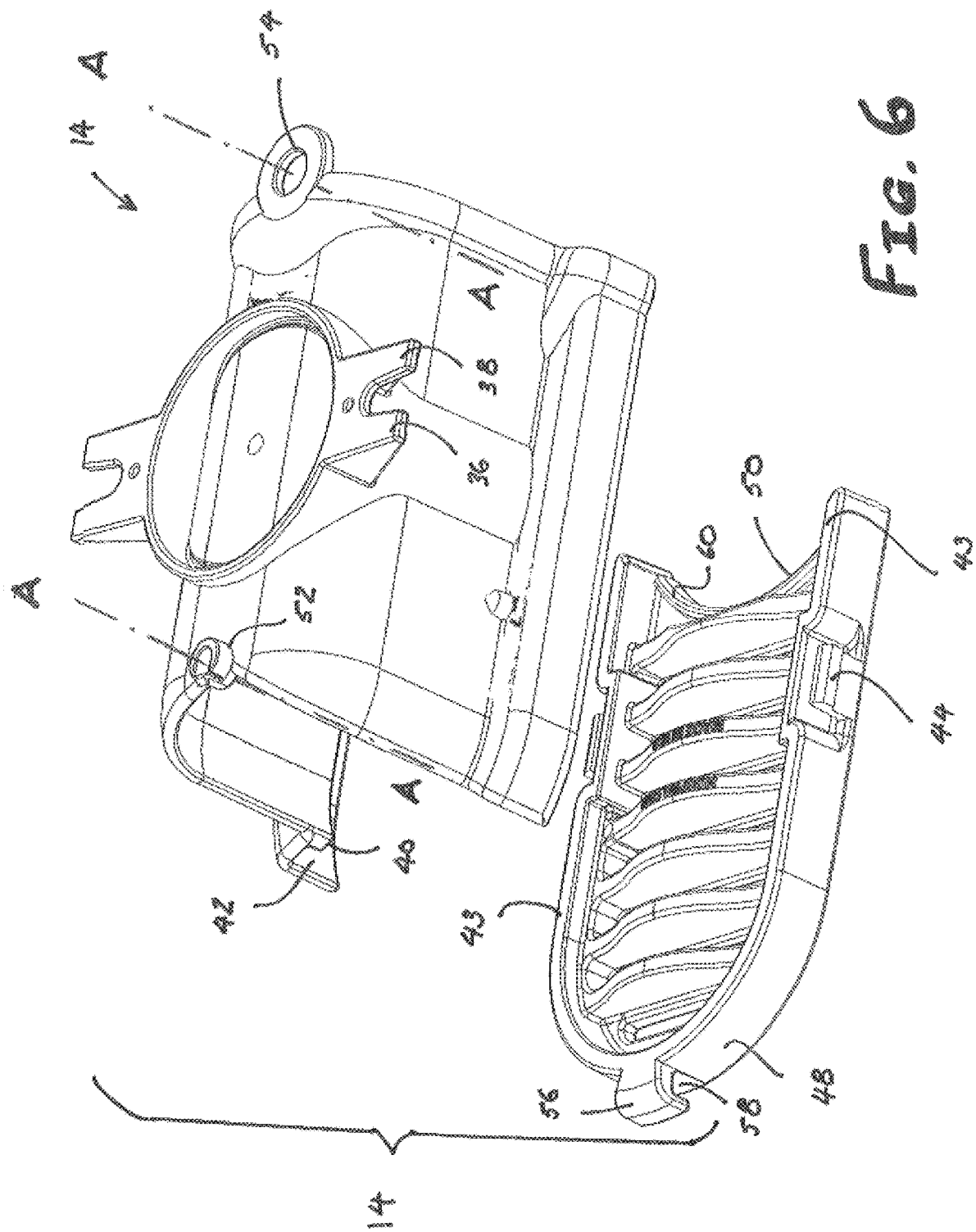
FIG. 6 is a perspective view of a single, inverted, channel unit being a component of the invention, in exploded view.

FIG. 3 shows how, in relation to FIG. 2, the grate 26 from the central unit 14 has been moved laterally aside, exposing a view into the base of the u-section 24. The same view may be seen in perspective in FIG. 5. Significant internal features of the u-section include a platform 40, extending along each of the lateral linear sides of the u-section. Each platform defines a channel 42, configured to receive a downwardly extending beam 43 that extends along the perimeter of the grate, as shown in FIG. 6. Thus, each grate may rest within each u-section, supported by the two lateral platforms 40. Preferably, the top side of the grate rests flush with the highest point of the u-section. To finally secure the grate to the u-section, a pair of mating detents is provided. A male detent 44 is formed on each lateral side of each grate, and a female detent 46 is provided adjacent each platform 40; and further, blocking walls 47 are provided in the channel 42 so that when the grate is dropped into the u-section, the male detent snaps into the female detent to hold the two elements securely together against relative vertical movement, and against relative longitudinal movement. However, the male detent is positioned on the end of a cantilever to provide some flexibility, so that an assembler may force the two elements apart by inserting a screw-driver blade between the elements, and forcing them apart.

Another feature of importance in the present invention is the shape and structure of the forward end of one unit in relation to the shape and structure of the rearward end of a succeeding unit. As seen in the figures, the forward (or proximal) end of the middle grate 26 has a positive semicircular profile 48 and the rearward (or distal) end of the first grate 22 has a negative semicircular profile 50 sized to receive the positive profile 48 of the middle grate. Notably, the two units 12, 14 are assembled in relation to each other such that the center point of the positive semicircular profile of grate 26 is coincident with the center point of the negative semicircular profile of grate 22. This has the advantage that when one unit is rotated in relation to a neighboring unit (as will be further described below), each of the two semicircular profiles rotate about the same axis A-A and maintain a constant gap between them. The diameter of the positive semicircular profile 48 is conveniently set to be the same as the width of the grate, as shown in FIG. 2. The diameter of the negative semicircular profile 50 is set to be slightly larger than the diameter of the positive semicircular profile 48 in order to provide some clearance.

Continuing with the description of the mating ends of two adjacent units: as seen in the figures, any two adjacent u-sections are joined together by mating detents that allow one u-section to rotate horizontally about a neighboring u-section. As seen in FIG. 6, a forward male rotational detent 52 is sized to fit into a rearward female detent 54 on a neighboring u-section. When neighboring units are connected together via the detents 52, 54 the center point of these detents lie on the vertical axis A-A (described above) so that the neighboring u-sections can rotate in a horizontal plane about the axis A-A. Significantly, the center points of the positive and negative semicircular profiles 48, 50 of the neighboring grates 22 and 26 also lie on the axis A-A so that when horizontal rotation of the u-sections in relation to each other takes place, a constant clearance gap is maintained between the neighboring grates. This has the advantage of producing a tidy solution in which the filtration properties of the channel 10 are not altered by rotation of the units in relation to each other.

Figure 7:
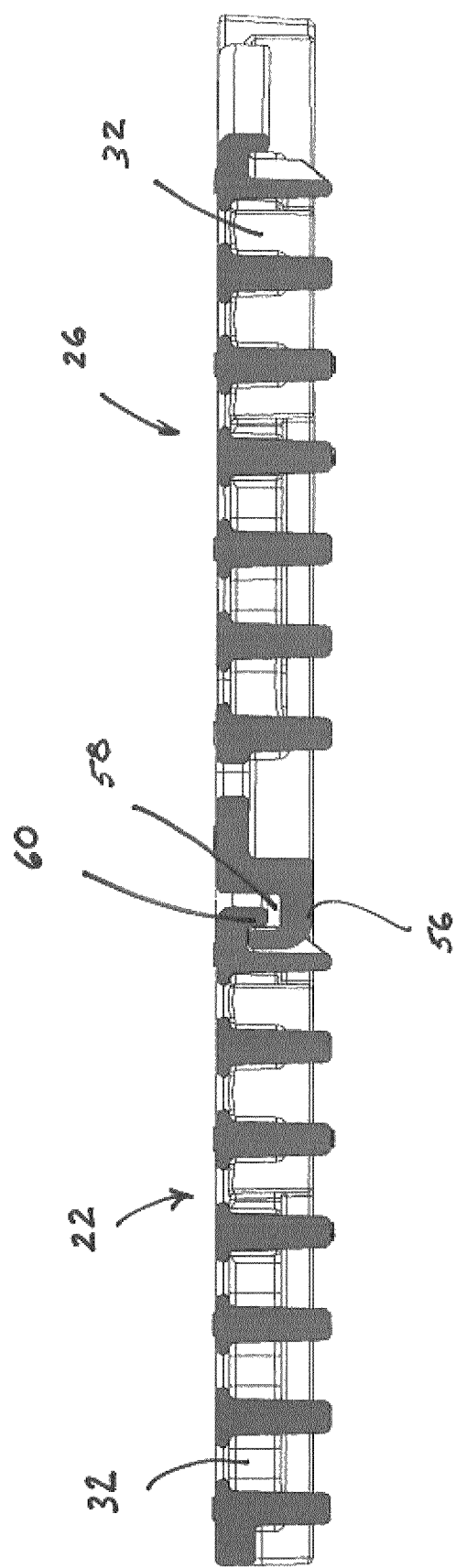
FIG. 7 is a partial sectional view, through a portion of the channel taken substantially along line 7-7 in FIG. 2.

Continuing further with the description of the mating ends of two adjacent units: as seen with reference to FIG. 6 and FIG. 7, the forward tip of each positive semicircular profile 48 of a grate includes a clip 56 that extends both axially forward (proximally), and in a separate step, vertically upwards to provide a short channel 58. The channel is sized and configured to receive a beam 60 that extends downwards along the lower perimeter of the negative semicircular profile 50 of each grate. As best understood with reference to FIG. 7, the forward channel 58 of one grate and the rearward beam 60 of a neighboring grate facilitate the alignment of neighboring grates in relation to each other during rotation of neighboring units in relation to each other. This is an advantageous feature of the channel 10, because it adds to the stability of the units in the horizontal plane, and tends to prevent one unit from rotating in a vertical plane in relation to a neighboring unit.

Figure 8:
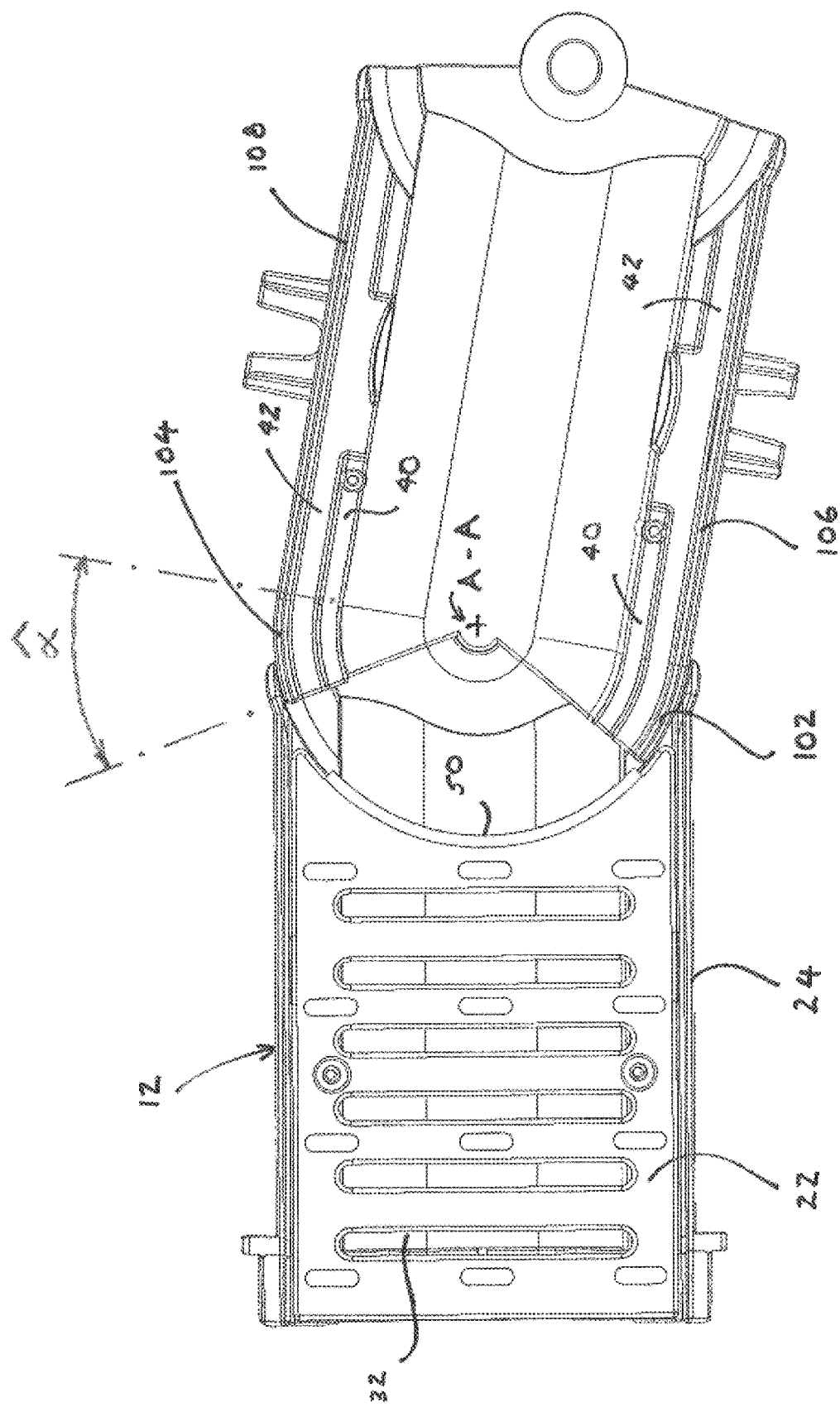
FIG. 8 is a perspective partial view of two connected units of a channel of the invention with connected units having features of the invention.

A further aspect of the mating ends of two adjacent units is the fact that they are designed to block the ingress of any concrete into the u-sections during laying of the channel, and pouring concrete around them. A problem that arises in a system containing two channels that articulate in relation to each other in a horizontal plane, is that a gap may open on the outer side of the channel, forming a space for ingress of concrete. The present invention solves this problem in the following way. Referring to FIG. 8, it is seen that the proximal end of the intermediate u-section 24 is configured to pivot, as described above, around the axis A-A which passes through the detents 52, and 54. What is significant in the proximal end of the u-section is that the side walls 106, 108 each terminate in a curved end portions 102, 104 respectively. These curved portions, when viewed from above, each form a sector of a circle which has its center on axis A-A. The angle formed about the center by each sector, shown in each case as the angle α in FIG. 8, is about 30 degrees, and may extend to between 5 degrees and 30 degrees. As understood with reference to FIG. 8, this feature allows the intermediate u-section to rotate about axis A-A in relation to each other, without forming a gap along the sidewalls of the two neighboring u-sections, and thus seals against the ingress of concrete during pouring.

In explanation of further features of the channel 10 shown in the figures, the following clarification is made. At the proximal end of the proximal unit 12, the unit terminates squarely. A special linear sleeve 100 is provided on the u-section 20 of unit 12 for connection to a standard commercially available linear channel (not shown) that will not require any articulation in relation with a neighboring unit. The grate 22 of unit 12 is also provided with a flat cut-off profile to adjoin with a standard adjoining grate (not shown). A similar sleeve and grate is provided on the distal end of distal unit 16.

It will be appreciated, however, that the described invention relates to the mating end portions of any two units that will be rotating in relation to each other, and that an articulating channel can be provided with as few as only two units (which would be the extreme units 12 and 16 from the figures) or any number greater than two, in which as many intermediate units as desired (of the intermediate kind shown as unit 14) may be inserted between the extreme units. In the present embodiment, the horizontal angle that two units may form in relation to each other is about 10 degrees. Therefore, a channel of the disclosed dimensions may form a right angled bend (i.e. 45 degrees) with about 5 or 6 units connected together. This modular concept allows for great design flexibility.

Although preferred illustrative variations of the present invention are described above, it will be apparent to those skilled in the art that various changes and modifications may be made thereto without departing from the invention. For example, it will be appreciated that combinations of the features of different embodiments may be combined to form another embodiment. It is intended in the appended claims to cover all such changes and modifications that fall within the true spirit and scope of the invention.

We claim:

1. A channel system for fluid flow, comprising a first unit and a second unit configured for connection to each other, wherein the first unit comprises: a first u-section having a first open top side, and a first grate extending across the first open top side and removably attached to the first u-section; and the second unit comprises; a second u-section having a second open top side, and a second grate extending across the second open top side and removably attached to the second u-section, wherein the first grate defines a negative semicircular distal end having a first diameter and a first center point and an entire first semicircular perimeter extending along the negative semicircular distal end of the first grate; the second grate defines a positive semicircular proximal end having a second diameter and a second center point and an entire second semicircular perimeter extending along the positive semicircular proximal end of the second grate; and further wherein, when the first unit is connected to the second unit, the first center point is coincident with the second center point and wherein the first diameter and the second diameter are sized such that the positive semicircular proximal end fits within the negative semicircular distal end for facilitating horizontal rotational movement of the first unit in relation to the second unit and further wherein, the first grate defines a beam adjacent the negative semicircular distal end, the beam extending downwardly and also laterally around the entire first semicircular perimeter of the negative semicircular distal end, and the second grate includes a proximally extending clip which defines an upwardly facing channel that is sized to receive the downwardly extending beam when the first unit is connected to the second unit, thereby facilitating horizontal alignment of the first grate with the second grate during horizontal rotation of the first grate in relation to the second grate.

2. The channel system of claim 1, wherein the first u-section defines a first detent at a distal end and the second u-section defines a second detent at a proximal end, the first detent being configured to engage with the second detent so as to permit rotation of the first unit in relation to the second unit about a vertical axis extending through the first center point and through the second center point when the first unit is connected to the second unit.

3. The channel system of claim 1, wherein
the second u-section defines a left platform on a left vertical wall and further defines a right platform extending along a right vertical wall, and
the second grate is sized to rest upon the left platform and the right platform.

4. The channel system of claim 3, wherein the left platform and the right platform define a left channel and a right channel respectively, and the second grate defines a left beam adjacent a left edge and a right beam adjacent a right edge, and wherein the left channel receives the right beam and the left channel receives the left beam.

5. The channel system of claim 3, wherein the second u-section and the second grate are removably attached to each other through male and female detent means for preventing vertical movement and longitudinal movement of the second grate in relation to the second u-section.

6. The channel system of claim 1, wherein the second u-section has a centerline which is parallel to a left sidewall and to a right sidewall, the left sidewall having a left proximal end and a left distal end, the right sidewall having a right proximal end and a right distal end, wherein and the left proximal end is shaped in the form of a left sector of a circle subtending to a left center point when viewed from above, and the right proximal end is shaped in the form of a right sector of a circle subtending to a right center point when viewed from above, wherein the left center point is coincident with the right center point at a common center point.

7. The channel system of claim 6, wherein the left sector and the right sector each subtend an angle of between 5 degrees and 30 degrees to the common center point.

8. The channel of claim 7, wherein the common center point coincides with an axis of rotation between the first u-section and the second u-section.

\* \* \* \* \*